(12) United States Patent
Hermann et al.

(10) Patent No.: US 8,153,290 B2
(45) Date of Patent: Apr. 10, 2012

(54) HEAT DISSIPATION FOR LARGE BATTERY PACKS

(75) Inventors: Weston Arthur Hermann, Palo Alto, CA (US); Scott Ira Kohn, Menlo Park, CA (US); Kurt Russell Kelty, Palo Alto, CA (US); Clay Hajime Kishiyama, San Francisco, CA (US); Anil Paryani, Cerritos, CA (US); Alexander Thomas Jacobs, Redwood City, CA (US); Grant Dufresne Cutler, Palo Alto, CA (US); Peng Zhou, El Cerrito, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 834 days.

(21) Appl. No.: 12/259,881

(22) Filed: Oct. 28, 2008

(65) Prior Publication Data

US 2010/0104935 A1 Apr. 29, 2010

(51) Int. Cl.
*H01M 10/50* (2006.01)
*H01M 6/42* (2006.01)

(52) U.S. Cl. .............. 429/120; 429/158; 429/159

(58) Field of Classification Search .............. 429/120, 429/158, 159
See application file for complete search history.

(56) References Cited

U.S. PATENT DOCUMENTS

| | | | |
|---|---|---|---|
| 5,620,057 A | 4/1997 | Klemen et al. | |
| 5,740,015 A | 4/1998 | Donegan et al. | |
| 5,866,276 A | 2/1999 | Ogami et al. | |
| 6,099,986 A * | 8/2000 | Gauthier et al. | 429/120 |
| 6,158,225 A | 12/2000 | Muto et al. | |
| 6,211,645 B1 | 4/2001 | Kouzu et al. | |
| 6,313,991 B1 | 11/2001 | Nagashima et al. | |
| 6,404,628 B1 | 6/2002 | Nagashima et al. | |
| 6,479,185 B1 | 11/2002 | Hilderbrand et al. | |
| 6,541,154 B2 | 4/2003 | Oogami et al. | |
| 6,705,254 B1 | 3/2004 | Grabowski et al. | |
| 6,821,671 B2 | 11/2004 | Hinton et al. | |
| 7,189,474 B2 | 3/2007 | Hamada et al. | |
| 7,230,404 B2 | 6/2007 | Kimoto et al. | |
| 2003/0017384 A1 * | 1/2003 | Marukawa et al. | 429/120 |
| 2004/0058233 A1 * | 3/2004 | Hamada et al. | 429/159 |
| 2004/0130288 A1 | 7/2004 | Souther et al. | |
| 2008/0070102 A1 | 3/2008 | Watanabe et al. | |
| 2008/0233475 A1 * | 9/2008 | Kozu et al. | 429/159 |

FOREIGN PATENT DOCUMENTS

| | | |
|---|---|---|
| EP | 1 505 669 A2 | 2/2005 |
| EP | 1 523 051 A2 | 4/2005 |

* cited by examiner

*Primary Examiner* — Patrick Joseph Ryan
*Assistant Examiner* — Muhammad Siddiquee
(74) *Attorney, Agent, or Firm* — Patent Law Office of David G. Beck

(57) ABSTRACT

One embodiment includes an electrical cell that includes a flat housing, at least one electrode and an electrically and heat conductive tab coupled to the electrode and extending through the housing for electrically and thermally coupling to a collector panel, the tab being capable of conducting both current and a substantial amount of heat out of the housing to a temperature control system. The cells may be stacked to form a battery having a temperature panel interfaced to the temperature control system by a thermal interface. The battery may propel an electrically-powered vehicle or the like.

14 Claims, 7 Drawing Sheets

700 ⤴

702
| CONDUCTING BOTH ELECTRICITY AND A SUBSTANTIAL AMOUNT OF HEAT OUT OF A STACK OF MULTIPLE ELECTRICAL CELLS THROUGH A SINGLE ELEMENT THAT CONDUCTS BOTH HEAT AND ELECTRICITY TO A COLLECTOR PLATE COMMON TO ALL OF THE CELLS |

↓

704
| CONDUCTING THE HEAT BUT NOT THE ELECTRICITY THROUGH A THERMAL INTERFACE MATERIAL CONTACTING THE COLLECTOR PLATE TO A COOLING SYSTEM EXTERNAL TO THE CELLS |

*Fig. 7*

HEAT DISSIPATION FOR LARGE BATTERY PACKS

BACKGROUND

There are a number of negative aspects to burning fuel in an internal combustion engine. Among these negative aspects are high cost, pollution, and the unnecessary depletion of natural resources. Transportation systems rely heavily these engines. The widespread use of these engines compounds their negative aspects.

Vehicles having electric or partially electric propulsion machinery address these negative aspects. However, their performance can be limited by battery performance. Various measures of battery performance include, but are not limited to, battery power capability, efficiency, capacity and life. One measure of battery performance is battery life, including cycle and calendar life, and heating of the battery during charging and discharging can decrease battery life. To improve battery life battery heating should be controlled and limited.

BRIEF DESCRIPTION OF THE DRAWINGS

FIG. 7 illustrates a method of conducting heat out of a battery pack, according to some embodiments.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
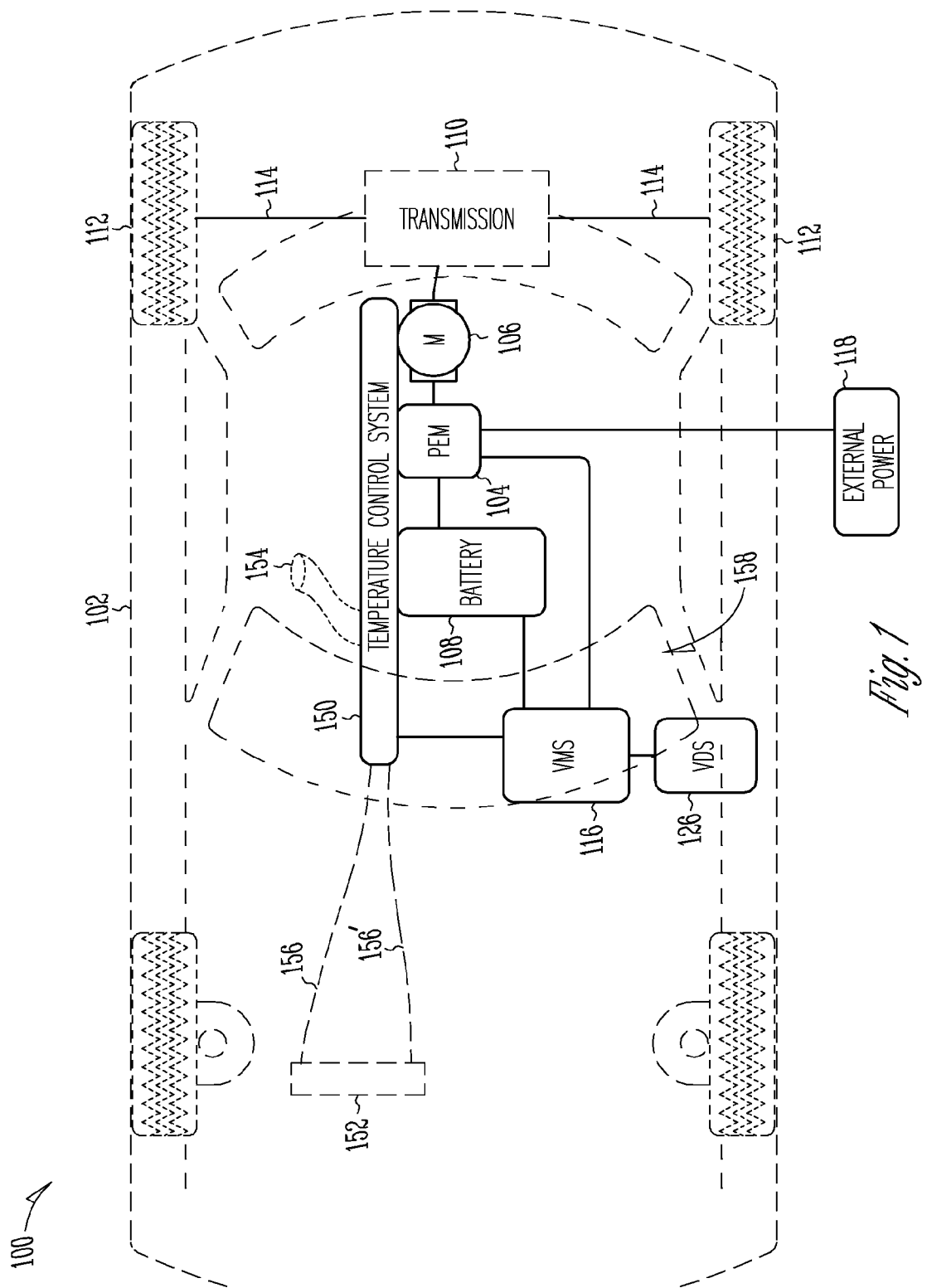
FIG. 1 illustrates a vehicle including a battery and a motor driven by that battery, according to some embodiments.

FIG. 1 shows a vehicle system 100, according to one embodiment of the present subject matter. In various embodiments, the vehicle 102 is an electric vehicle and includes a vehicle propulsion battery 108 and at least one propulsion motor 106 for converting battery energy into mechanical motion, such as rotary motion. Various batteries are contemplated. The present subject matter includes embodiments in which the battery 108 is a secondary battery that is rechargeable using electricity rather than chemicals or other materials. Various secondary battery chemistries are contemplated, including lithium ion chemistries such as lithium polymer, lithium iron phosphate, nickel metal hydride, lead acid, and other chemistries.

The present subject matter includes examples in which the vehicle propulsion battery 108 is a subcomponent of an energy storage system ("ESS"). The battery 108 includes a battery pack that includes a plurality of electrical cells. The battery 108 can include a plurality of battery packs. An ESS includes various components associated with transmitting energy to and from the vehicle propulsion battery 108, including, but not limited to, safety components, cooling components, heating components, rectifiers and combinations thereof. The present subject matter should not be construed to be limited to the configurations disclosed herein, as other configurations of a vehicle propulsion battery 108 are possible.

The battery 108 includes one or more electrical cells in various examples. In some examples, the battery 108 includes a plurality of lithium ion cells coupled in parallel and/or series. A battery pack includes multiple flat electrical cells in a stack, positioned perpendicular to their major surfaces.

A battery pack includes a plurality of electrical cells stack and structures to electrically and physically interconnect the electrical cells. For example, a battery pack includes a stack of electrical cells that are interconnected in parallel with one or more busbars or collector plates. A battery pack can optionally include a housing for the stack of electrical cells. Several battery packs can optionally be connected in parallel or series, by electrically connecting multiple collector plates of multiple battery packs.

A flat cell is an object having major first and second surfaces that are generally parallel to one another. The thickness of the flat cell is the distance between the first and second major surfaces. This thickness is generally smaller than the perimeter dimensions of either of the first or second major surfaces.

A stack refers to a configuration of cells, such that the cells are placed onto one another in alignment. In some stacks, each of the cells has a perimeter, and each of these perimeters is substantially coextensive.

Some examples include a first plurality of cells connected in parallel to define a first battery pack, with a second plurality of cells connected in parallel to define a second battery pack, with the first pack and the second pack connected in series. In some embodiments, the stack includes around 2 to 3 cells. Such a stack is useful for a city car. A city car is a car that has a smaller size and a limited range requirement. One example of a city car is a car that is between around 3.4 meters and 3.6 meters long. Some city car examples are required to travel at least 40 miles before recharge is required. Some stacks are configured for use in a typical passenger car. This is a car that is longer than a city car. In these examples, the pack can include up to 8 cells coupled electrically in parallel. The cells for the car sizes discussed here are adapted to store about 73 watt-hours of energy, although other energy levels are possible.

Battery voltage, and consequently, pack voltage, often ranges from around 4.2 volts to about 2.8 volts in use. In part because the voltage of batteries ranges from cell to cell, some instances include voltage management systems to maintain a steady voltage. Some embodiments connect 9 battery packs in series to define a module. Such a module has around 35 volts. Some instances connect 11 modules in series to define the battery of the ESS. The ESS will demonstrate around 400 volts in various examples.

The ESS may include a state of charge circuit to monitor the state of charge of the battery 108. The state of charge circuit can count coulombs, watt-hours, or provide other measure of how much energy is in the battery 108. In some embodiments, the state of charge is determined by measuring the battery voltage either open circuited or driving a known load. In additional embodiments, the state of charge circuit could optionally provide additional battery information, such as temperature, rate of energy use, number of charge/discharge cycles, and other information relating to battery state.

Additionally illustrated is an energy converter termed a power electronics module, or "PEM" 104. The PEM 104 is part of a system which converts energy from the vehicle propulsion battery 108 into energy useable by the at least one propulsion motor 106. In certain instances, the energy flow is from the at least one propulsion motor 106 to the vehicle propulsion battery 108. In some examples, the vehicle propulsion battery 108 transmits energy to the PEM 104, which converts the energy into energy usable by the at least one propulsion motor 106 to propel the electric vehicle. In additional examples, the at least one propulsion motor 106 generates energy that is transmitted to the PEM 108. In these examples, the PEM 108 converts the energy into energy which can be stored in the vehicle propulsion battery 108. In certain examples, the energy converter 104 includes transistors. Some examples include one or more field effect transistors. Some examples include metal oxide semiconductor field effect transistors. Some examples include one more insulated gate bipolar transistors. In various examples, the PEM 108 may include a switch bank which is configured to receive a direct current ("DC") power signal from the vehicle propulsion battery 108 and to output a three-phase alternating current ("AC") signal to power the vehicle propulsion motor 106. In some examples, the PEM 108 may be configured to convert a three phase signal from the vehicle propulsion motor 106 to DC power to be stored in the vehicle propulsion battery 108. Some examples of the PEM 108 convert energy from the vehicle propulsion battery 108 into energy usable by electrical loads other than the vehicle propulsion motor 106. Some of these examples switch energy from approximately 390 Volts DC to 14 Volts DC.

The propulsion motor 106 may be a three phase AC induction motor. Some examples include a plurality of such motors. The present subject matter can optionally include a transmission or gearbox 110 in certain examples. While some examples include a 1-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission 110 to wheels 112 via one or more axles 114, in various examples.

A vehicle management system 116 is optionally provided which provides control for one or more of the vehicle propulsion battery 108 and the PEM 104. In certain examples, the vehicle management system 116 is coupled to vehicle system which monitors a safety system such as a crash sensor. In some examples the vehicle management system 116 is coupled to one or more driver inputs, such as acceleration inputs. The vehicle management system 116 is configured to control power to one or more of the vehicle propulsion battery 108 and the PEM 108, in various embodiments.

A temperature control system 150 is to control the temperature of the battery 108, and may heat or cool the battery. The temperature control system can optionally control the temperature of the PEM 104 and/or the motor 106. Although the temperature control system 150 is pictured as one component (i.e., the cooling system of components 104, 106 and 108 is integrated), embodiments are possible in which each of the battery 108, the PEM 104 and the motor 106 has an individual temperature control system. Integrated temperature control systems that control the temperature of two of these components are possible.

Some embodiments include a fin system that can control temperature using convection. Additional embodiments include a refrigeration system and conduct heat from the battery 108 using circulating liquid. A refrigeration system of the temperature control system 150 includes a compressor powered by an electric motor that is powered by the battery 108.

Some embodiments include a heating system to heat the battery 108. The heating system includes electric heating elements that are powered by the battery 108. Battery heating is useful to heat a battery when the ambient temperature is cool such that the battery is below a predetermined temperature.

The temperature control system 150 can optionally cool or warm a cabin 158 of the vehicle 100, such as by blowing cooled or warmed air through one or more ducts such as duct 154. Temperature control of the cabin 158 can occur concurrent to controlling the temperature of the power train components of the vehicle, including, but not limited to, the PEM 104, the motor 106 and the ESS 108.

In some embodiments, the temperature control system 150 includes a heat exchanger 152 external to the cabin 158 for shedding heat. This heat exchanger 152 is coupled to other portions of the temperature control system 150 via coolant tubes 156 and 156'. This heat exchanger 152 can be a part of a refrigeration system, or it can be a fluid cooling system that circulates fluid to cool one or more of the power train components.

In various embodiments, the temperature control system 150 absorbs heat from the battery 108. The temperature control system 150 includes one or more cooled panels that touch the battery 108 and which cool the battery 108 by directing fluid that is cooler than the electrical cells through the panels and by the electrical cells of the battery 108 so that heat is conducted out of the electrical cells and into the fluid of the temperature control system 150.

External power 118 is provided to the PEM 104, in various examples. The PEM 104 converts energy into energy that can be stored by the battery 108. In various embodiments, external power 118 includes a charging station that is coupled to a municipal power grid. In certain examples, the charging station converts power from a 110V AC power source into power storable by the vehicle propulsion battery 108. In additional examples, the charging station converts power from a 120V AC power source into power storable by the vehicle propulsion battery 108. Some embodiments include converting energy from the battery 108 into power usable by a municipal grid using the PEM 104 to convert energy. The present subject matter is not limited to examples in which a converter for converting energy from an external source to energy usable by the vehicle 100 is located outside the vehicle 100, and other examples are contemplated.

Some examples include a vehicle display system 126. The vehicle display system 126 includes a visual indicator of system 100 information in some examples. In some embodiments, the vehicle display system 126 includes a monitor that includes information related to system 100. The vehicle display system 126 can include information relating to vehicle state of charge.

Figure 2A:
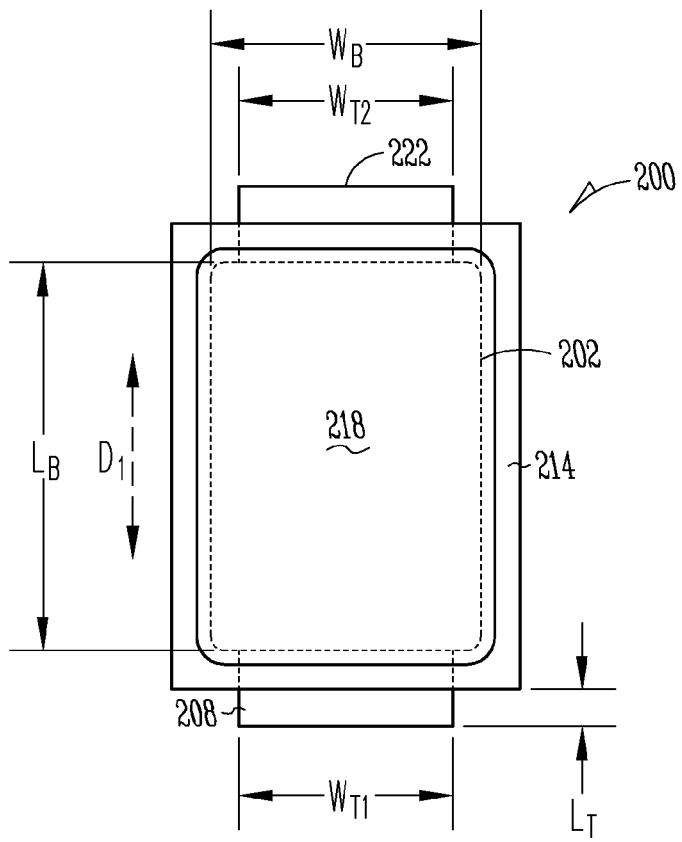
FIG. 2A illustrates a top view of an electrical cell, according to some embodiments.
Figure 2B:
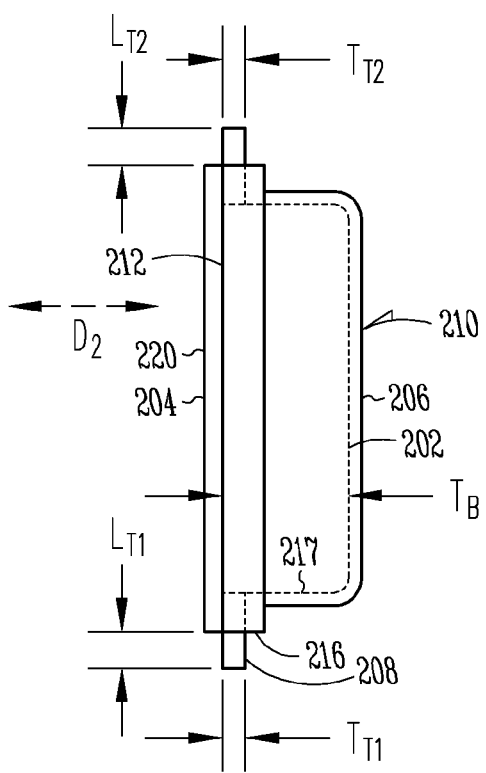
FIG. 2B illustrates a side view of the electrical cell of FIG. 2A.

FIG. 2A illustrates a top view of an electrical cell 200, according to some embodiments. FIG. 2B illustrates a side view of the electrical cell of FIG. 2A. In some embodiments the electrical cell 200 is an electrochemical battery. It is variously referred to as a pouch cell or a flat cell. The electrical cell 200 includes an electrode stack or bank 202 sandwiched between a first 204 and second 206 electrical cell housing layer. An electrically and heat conductive tab 208 extends through the housing 210.

The electrode bank 202 includes at least one anode and at least one cathode. Between the anode and the cathode is a separator that physically and electrically isolates the anode and the cathode from one another. In some embodiments, the electrode bank 202 includes an anode ribbon and a cathode ribbon that are folded into the electrode bank 202. Accordingly, a cross section of the bank taken through the fold lines would show a zig-zag pattern.

In additional embodiments, the electrode bank 202 includes a plurality of individual or separate anode layers and individual or separate cathode layers. In these embodiments, the electrode bank 202 does not include folding of the anode layers or the cathode layers. For example, a pick and place process can stack an anode layer, then a separator layer onto the anode layer, and then a cathode onto the separator layer. This process can repeat to build up the electrode bank 202. The process can optionally align layers of the electrode bank 202 so that the perimeters along the layer edges are coextensive with one another. Generally, a layer of the bank 202 is rectangular and has a pair of major surfaces and an edge that extends between the pair of major surfaces, the edge being small in relation to either of length or width dimensions of the major surfaces. Banks that are not rectangular are also possible. Other electrode bank configurations are possible and can be used with the present subject matter. Additionally, capacitors and power sources that are hybrid, including but not limited to fast charging batteries that charge nearly as quickly as capacitors, can be used with the present subject matter.

The electrode bank 202 is positioned in housing 210. The housing 210 includes a generally hexahedral shape with first 218 and second 220 major surfaces being approximately parallel with an edge 216 extending between the first 218 and second 220 major surfaces. In some embodiments, the housing 210 includes first 204 and second 206 electrical cell housing layers. These are joined together in a seam 212. The seam 212 includes abutting faces of the first 204 and second 206 electrical cell housing layers. This abutment encircles the electrode bank 202 and defines a flange 214.

Extending through the flange 214 and the seam 212 and between the first 204 and second 206 electrical cell housing layers is the tab 208. The tab 208 extends away from a housing edge 216 of the housing 210. Additional configurations include, but are not limited to, those in which the tab extends through a sealed aperture in one of the electrical cell housing layers 204, 206, the seal being at least restrictive enough to restrict the flow of electrical cell electrolyte. The tab 208 is connected to at least one electrode of the electrode bank 202. The tab 208 abuts one or more electrodes and is welded, soldered or otherwise connected to the electrode. In some examples, the tab 208 is bent so that it can extend along the edge 217 of the electrode bank 202.

The tab 208 is heat conductive and the one or more electrodes to which the tab 208 is connected are heat conductive. These electrodes are substantially more conductive than the separator and electrolyte of the electrical cell 200. Accordingly, heat conduction in the $D_1$ direction is substantially larger than heat conduction in the $D_2$ direction. Using the tab 208 to conduct heat takes advantage of this.

Various rigid housing materials can be used such as aluminum, titanium, or steel. However, cell 200 uses electrical cell housing layers 204 and 206 that are generally flexible. Although these layers are thermally conductive, conducting heat from the electrode bank 202 through the electrical cell housing layers 204, 206 and then cooling those layers with heat radiation or convection provides an insufficient amount of cooling. This is especially so in embodiments in which the electrical cell 200 is positioned in a further housing that is sealed to restrict the flow of air into and out of the further housing.

In various embodiments, the material of the electrical cell housing layers 204 and 206 is a thermoplastic polymer. In some examples, it is capable of being heat sealed to itself. Materials possible include, but are not limited to, polyethylene, polypropylene, PVC, nylon, FEP, and PFA. The thickness of the material can vary. In some examples, it is approximately 0.002 inches thick. The sealed first 204 and second 206 electrical cell housing layers define an interior that is sealed. In various embodiments, the interior is filled with electrolyte.

As used herein, the housing edge 216 refers to the any of the surfaces that are not the major surfaces 218 or 220 of the housing. An optional tab 222 can be positioned along edge 216 and connected to an electrode. This tab 222 can be similarly sized to the other tab 208, but the present subject matter is not so limited. This second tab 222 can extend through the housing 210 via the seam 212 and away from the housing 210, although other configurations are possible. The first tab 208 and a second tab 222 may be used as terminals for different poles of the electrical cell 200. For example, the tab 208 can be connected to an anode and the tab 222 can be connected to a cathode.

The dimension $W_B$ refers to a width of the electrical cell 200. The dimension $L_B$ refers to the length of the electrical cell 200. The dimension $T_B$ relates to the thickness of the electrical cell 200. The dimensions as diagrammed reflect the thickness of the bank 202 and the housing portions 204 and 206, but discount the flange in measuring length $L_B$ and width $W_B$. In one embodiment, the width $W_B$ of the electrical cell is 216 millimeters, the length $L_B$ of the electrical cell is 129 millimeters, and the thickness $T_B$ of the electrical cell is 7.4 millimeters. The length $L_B$ and the width $W_B$ of the electrical cell are substantially larger than the thickness $T_B$ of the electrical cell. Some, embodiments are contemplated wherein the width of the electrical cell is approximately 30 times the thickness of the electrical cell, and the length of the electrical cell is approximately 17 times the thickness of the electrical cell. Various electrical cells 200 having this size have a capacity of approximately 20.5 amp-hours. Some have an energy of 72 watt-hours.

The first tab 208 has a width of $W_{T1}$, a length of $L_{T1}$, and a thickness of $T_{T1}$. The second tab 218 has a width of $W_{T2}$, a length of $L_{T2}$, and a thickness of $T_{T2}$. Various materials are used for one or both of the tabs, including, but not limited to, copper, aluminum and alloys thereof. The tab is coupled to one or more electrodes of the bank 202 so that the tab conducts both electricity and a substantial amount of heat from the bank 202 and out of the housing 210. The tab 208 is sized to conduct a substantial amount of heat away from the electrode bank 202. The heat conducting properties of the tab 208 will be explained in conjunction with FIG. 3, which illustrates a side view of the electrical cell 200 and includes diagrammatic symbols that illustrates thermal conductivity values of electrical cell 200 and some additional structures 302, 304.

The tab 208 may be sized so that it is larger than a tab required to fulfill the electrical charging and discharging needs the electrical cell 200. In various examples, the normal charge rate of the electrical cell 200 is its capacity divided by 3. This is over one hour. This charge rate is termed "C/3". In various embodiments, the discharge rate is the capacity of the electrical cell 200 depleted over one hour. This is "1C".

To fulfill the charge and discharge needs, the electrical resistance of tab 208 should be small compared to the DC impedance of the electrical cell 200. An example tab 208 may have a resistance that is 10% of the electrical resistance of the electrical cell 200 and can be as low as 1% or lower. The cell 200 has an electrical resistance of approximately 5.8 milliohms. The electrical resistance of the tab is given in equation 1.

$$R_{ELECTRICAL} = \frac{l \cdot \rho}{A}. \tag{1}$$

R represents the electrical resistance of the tab 208. "l" represents the length of the tab. "ρ" represents the resistivity of the tab 208. "A" represents the cross sectional area of the tab 208, (i.e. $W_{T1} * T_{T1}$). A tab 208 of copper at 20 degrees Celsius has a resistivity of approximately 1.72 E-8 ohm meters. For a tab that has a has a width of $W_{T1}$ of 0.018 meters a length of $L_{T1}$ of 0.01 meters, and a thickness of $T_{T1}$ of 0.001 meters, the tab has a resistance of approximately 9.5 E-4 milliohms. This is a small fraction of the resistance of the electrical cell 200. Accordingly, tab 208 having these dimensions is sufficiently conductive to facilitate the discharge of the electrical cell 200. Even a doubling of area "A" would not affect the ratio of resistances between the electrical cell 200 and the tab 208 greatly.

In many examples, the mechanical requirements of the tab 208 constrain its size, as a tab that was sized to fulfill a minimum level of conductivity would be subject to ripping or breaking in use. As yet designers have not designed tabs with the constraint that they are sized to remove a substantial amount of heat from the electrical cell 200.

The total resistance to heat flow from the battery pack is as follows:

$$R_{TOTAL\_THERMAL} = R_{INPLANE} + R_{TAB} + R_{PANEL} + R_{TIM}. \tag{2}$$

wherein $R_{TOTAL\_THERMAL}$ is the thermal resistance of a battery system thermal conduction path away from the electrical cell 200. Example units for thermal resistance are degrees Celsius per watt. $R_{INPLANE}$ is the resistance to thermal conduction along axis $D_2$. $R_{TAB}$ is the thermal resistance of the tab 208. $R_{PANEL}$ is the resistance of a busbar or collector panel 302 to which tab 208 is connected to. The connections between the tab 208 and the collector panel 302 can be through ultrasonic welds or other connections. $R_{TIM}$ is the thermal resistance of a thermal interface material 304 confronting the collector panel 302. In this confronting relationship, the collector panel 302 includes a surface 307 that faces a surface 305 of the thermal interface material 304. In a confronting relationship, the collector panel 302 and the thermal interface material 304 need not touch. In these cases, convection or radiation would be relied on for temperature control. However, in some embodiments, the thermal interface material 304 abuts the collector panel 302.

A thermal interface layer may comprise a relatively thin layer of material. This material can be a solid, grease, or liquid. A thermal interface layer has a high heat conductivity but a low electrical conductivity. In some examples, it is a dielectric. An example thermal interface material includes a ceramic-filled silicone rubber. Some examples include alumina-filled silicone rubber with a thermal conductivity of 1 W/mK. An alternative example thermal interface material includes a thermal grease, which is also termed thermal compound, heat paste, heat transfer compound, thermal paste, or heat sink compound. Thermal grease can use one or more different thermally conductive substances. Ceramic-based thermal grease has favorable thermal conductivity and may be composed of a ceramic powder suspended in a liquid or gelatinous silicone compound. Some examples and their thermal conductivities in units of W/m·K are: beryllium oxide, 218, aluminum nitride, 170, aluminum oxide, 39, zinc oxide, 21, and silicon dioxide, 1. Metal-based thermal greases may contain metal particle. Carbon based materials may use diamond powder or short carbon fibers. Liquid metal based may be formed of liquid metal alloys such as gallium. Various compounds use silicone grease as a medium, which is a favorable heat conductor, though some embodiments use mineral oil.

The amount of heat that is being produced by electrical cell 200 in use is predetermined by its application. For example, in a vehicle, the amount of heat produced is understood after designers design and test the vehicle. The heat produced over the course of a one-hour discharge can be approximated by the one-hour discharge current of the electrical cell 200 squared multiplied by the electrical impedance of the electrical cell 200. An application may require that the temperature at the surface 306 of the thermal interface material 304 be a predetermined temperature that is within a range specified for use. This range can be specified by a standards organization or by another party such as a manufacture of automobiles. The difference between the temperature of the electrical cell 200 and the surface 306 is expressed as ΔT. Using this input, it is possible to determine the thermal resistance desired for a conductive path extending from an electrical cell. This can be expressed as:

$$R_{TARGET} = \left(\frac{\Delta T}{CURRENT^2 \cdot IMPEDANCE}\right). \tag{3}$$

The following is an application goal:

$$R_{TOTAL\_THERMAL} \leq R_{TARGET}. \tag{4}$$

Therefore, an application goal is:

$$R_{TAB} \leq \left(\frac{\Delta T}{CURRENT^2 \cdot IMPEDANCE}\right) - \tag{5}$$
$$(R_{INPLANE} + R_{INTERFACE} + R_{COATING}).$$

The thermal resistance of the tab can be expressed as:

$$R_{TAB} = \left(\frac{L_{T1}}{k_{TAB} \cdot T_{T1} \cdot W_{T1}}\right). \tag{6}$$

Therefore:

$$\left(\frac{L_{T1}}{k_{TAB} \cdot T_{T1} \cdot W_{T1}}\right) \leq \tag{7}$$
$$\left(\frac{\Delta T}{CURRENT^2 \cdot IMPEDANCE}\right) - (R_{INPLANE} + R_{INTERFACE} + R_{COATING})$$

wherein $k_{TAB}$ is the thermal conductivity of the tab 208.

In various embodiments, the tab 208 has a ratio between a cross sectional area (i.e., $T_{T1}*W_{T1}$) perpendicular to a length $L_{T1}$ of the tab and the length $L_{T1}$ that is significantly larger than a further ratio of cross sectional area perpendicular to length to length sized to conduct electrical energy, that is to have an electrical resistance as discussed above, at a rate required by a maximum charge or discharge rate of the electrical cell. Since the tab 208 can easily meet the requirements of electrical conduction, the size of the tab is selected based on the ΔT that is required. If the longer tab is used, a greater cross sectional area is required, and so on. Accordingly, one or both of the tabs 208 and 222 have a mass that is substantially larger than a mass required to conduct current at a predetermined maximum cell electrical discharge rate. This mass can be at least 10% larger and up to or exceeding 100% larger. In further embodiments, the tab can be formed of a material with an improved thermal and/or electrical conductivity that than required to conduct current at a predetermined maximum cell discharge rate.

The electrical cell 200 has varying thermal conductivity properties. It is non-isotropic in some embodiments. In some examples, the thermal conductivity in plane, along axis $D_1$, is smaller than the thermal conductivity along axis $D_2$. In some examples, the conductivity along $D_1$ is approximately 1.2 watts per meter Kelvin. In some examples, the conductivity along $D_2$ is approximately 25 W per meter Kelvin. The present subject matter takes advantage of the non-isotropic nature of the cell by conducting heat along an axis that has maximum heat conductivity.

In one example that demonstrates the improved function of the tab 208, the tab 208 has a higher volumetric energy density than a panel that is abutting one of the major surfaces 218, 220 of the electrical cell 200 and has a length and a width that is coextensive with the length and the width of the electrical cell 200 (i.e., not including the flange 214). In some examples, a tab 208 that is copper and that has dimensions of 0.0005 meters by 0.01 meters by 0.180 meters has an approximately 13.5% improved volumetric energy density over a plane contacting one of the major surfaces of the electrical cell 200, the plane having dimensions of 0.129 meters by 0.007 meters by 0.216 meters. The improvement in gravimetric energy density is approximately 15.0%. The tab approach to removing heat using thermal conduction outperforms a panel embodiment in which a temperature control panel is touching one of the major surfaces 218, 220 of the electrical cell.

Figure 3:
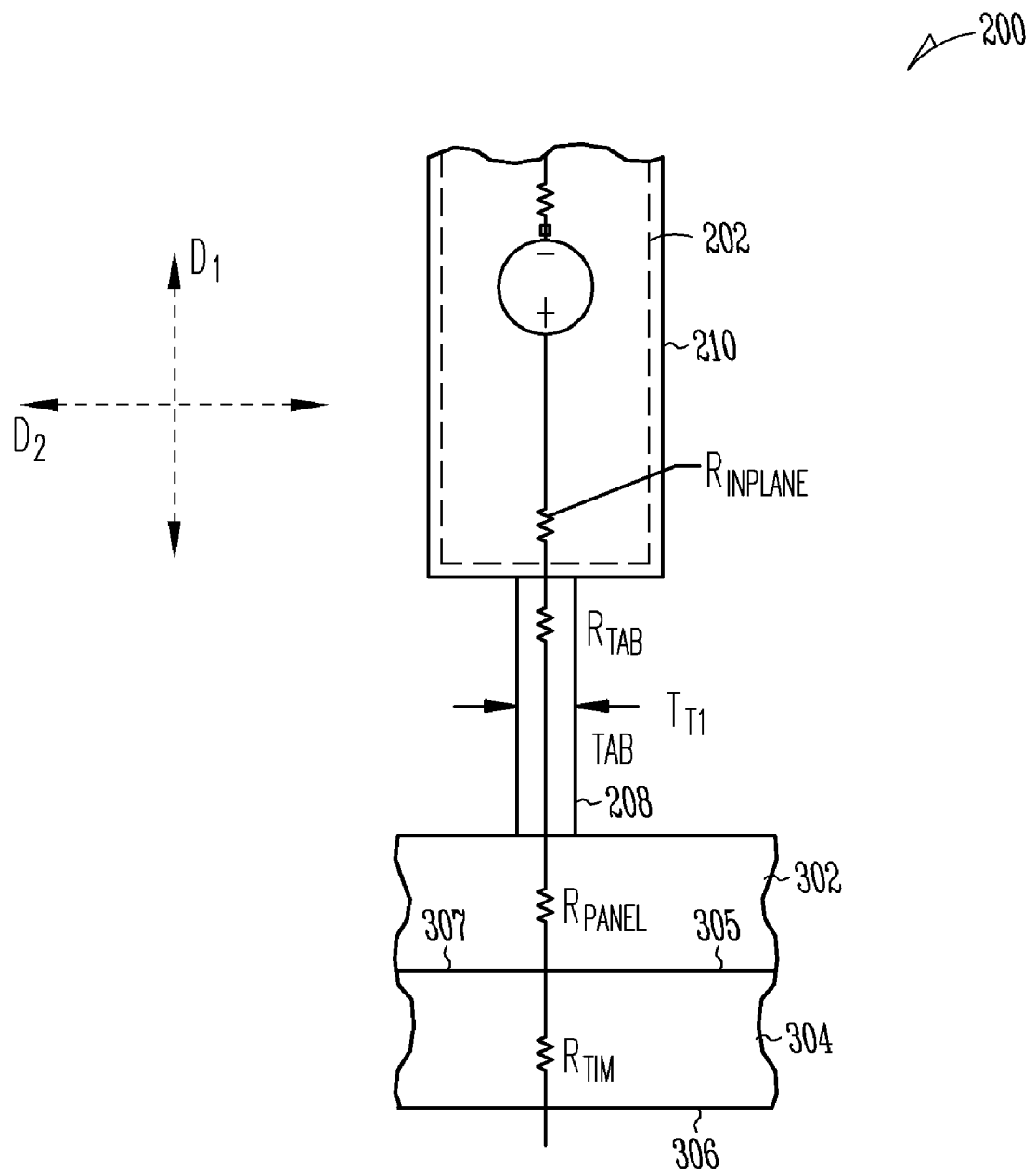
FIG. 3 illustrates a side view of an electrical cell assembly that also illustrates thermal conductivity values by superimposing symbols onto respective components, according to some embodiments of the invention.
Figure 4A:
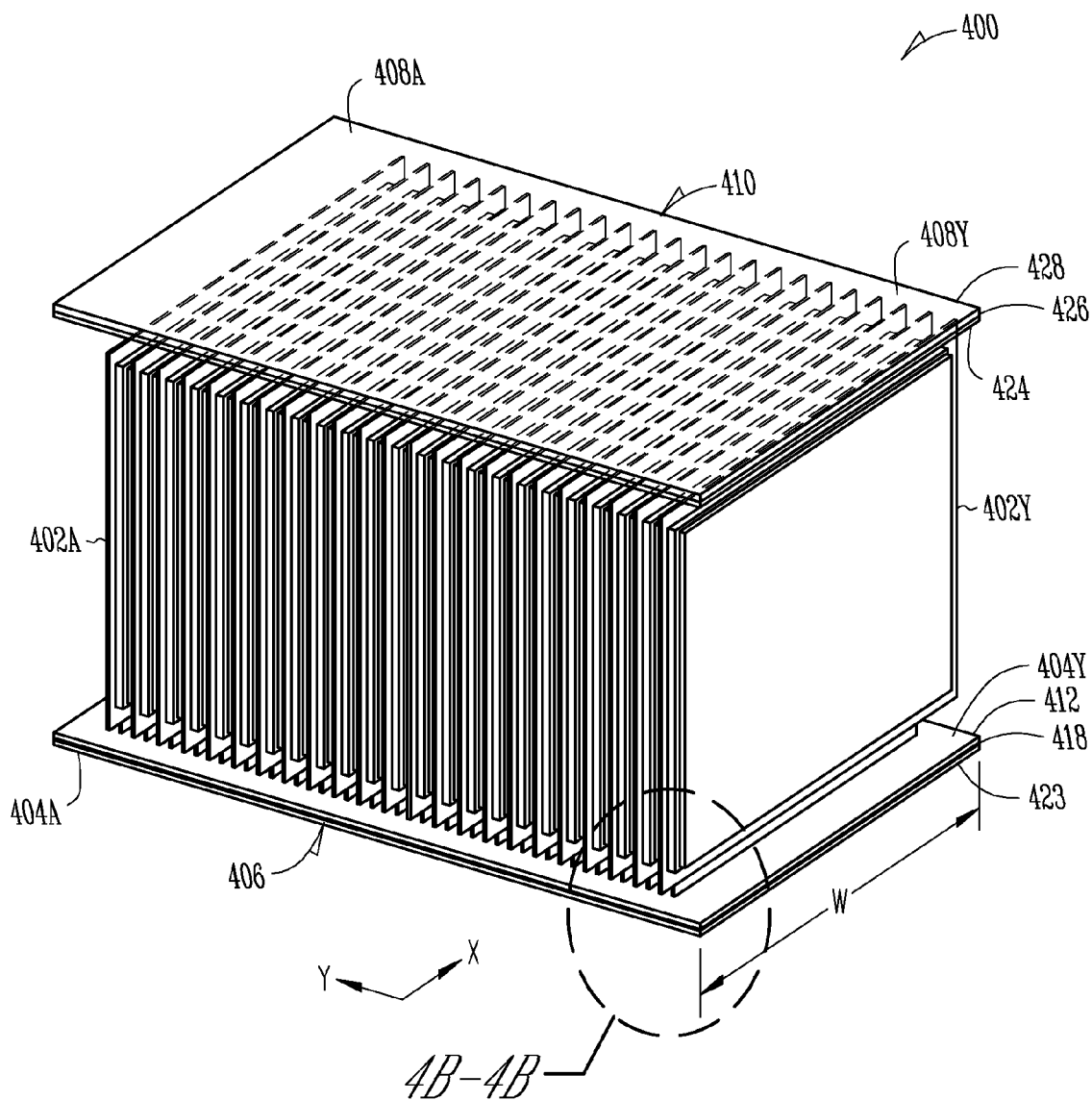
FIG. 4A illustrates an isometric view of a battery pack including a plurality of electrical cells, according to some embodiments.
Figure 4B:
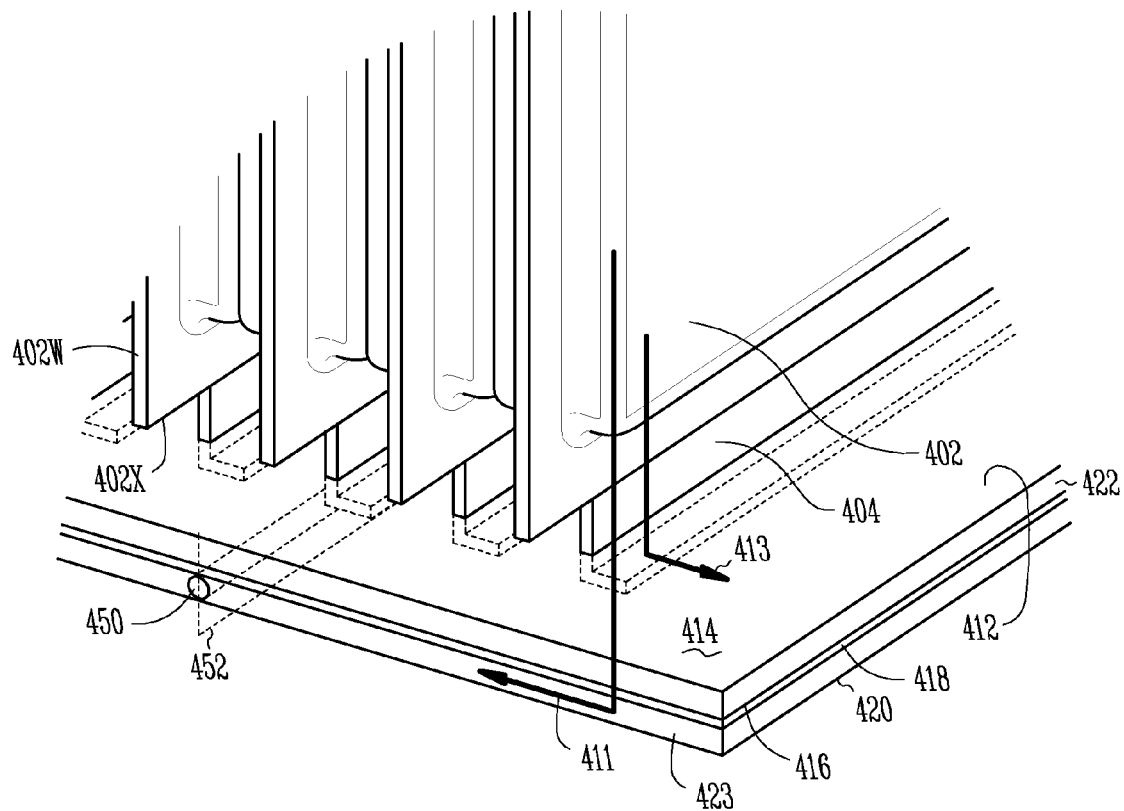
FIG. 4B illustrates an enlarged view of "4B" in FIG. 4A.

FIG. 4A illustrates an isometric view of a battery pack including a plurality of electrical cells, according to some embodiments. FIG. 4B illustrates an enlarged view of the portion of FIG. 4A labeled "4B". Individual electrical cells 402A, . . . , 402Y are shown arranged in a stack. The cells of FIGS. 2A, 2B and 3 are compatible with the examples of FIGS. 4A and 4B. Although 25 cells are illustrated, other numbers are possible. In various embodiments, the cells are similarly-shaped electrical cells. Each of the cells includes at least one electrically and thermally conductive tab 404A, . . . , 404Y coupled to the at least one electrode of the cell. The tabs 404A, . . . , 404Y conduct both current and a substantial amount of heat out of a housing of the cell. In the illustration, a first set of tabs 404A, . . . , 404Y is aligned on one side 406 of the battery pack, and a second set of tabs 408A, . . . , 408Y is aligned on a second side 410. Heat conduction is shown at 411. Current conduction is shown at 413. In some embodiments, the flat housings of the electrical cells 402A, . . . , 402Y are spaced apart from one another with air gaps.

The battery pack includes an electrically and heat conductive collector panel 412. The tabs 404A, . . . , 404Y are folded and are coupled to the collector panel 412. The collector panel includes a first planar surface 414 electrically and thermally coupled to each of the tabs. The collector panel 412 additionally includes a second surface 416 opposite the first surface 414. The collector panel 412 can be metallic and can be formed of copper and its alloys, aluminum and its alloys, combinations thereof, or other metals or electrically and thermally conductive materials.

The battery pack 400 additionally includes a thermal interface material 418 that is electrically insulative and thermally conductive. The thermal interface material includes a first surface 420 in thermal contact with the second surface 416 of the collector panel. The thermal interface material 418 additionally includes a second surface 422 in contact with a temperature control panel that is in thermal contact with an external temperature control system. A second set of tabs 408A, . . . , 408Y is shown coupled to a second collector panel 424, a second thermal interface material 426 and a second temperature control panel 428.

In various embodiments, the temperature control panels 423 and 428 are in fluid communication with a temperature control system such as the system 150 disclosed in FIG. 1. The temperature control systems contemplated may circulate fluid that is at a specified temperature. In some examples, the fluid is at an ambient temperature. The temperature control panel 423 is heated or cooled by fluid that is one temperature as set by the temperature control system 150. The temperature differential between the temperature control panel 423 and the thermal interface material 418 causes heat to flow toward or away from the collector panel 412. The collector panel 412 has low thermal resistance and conducts heat with the tabs 404A, . . . , 404Y and causes them to be heated or cooled.

The temperature control system can circulate fluid to heat or cool the temperature control panel 423. In some embodiments, the temperature control panel is a panel defining a series of lumens. In some additional embodiments, the temperature control panel is a panel with a plurality of heat conductive tubes coupled to the panel, such as by welding, soldering or the like. In some examples, the temperature control panel defines a temperature control path 450 extending along the width W of the tabs 404A, . . . , 404Y. In some of these embodiments, at least one temperature control path 450 is bisected by the plane 452 of a tab.

Figure 5:
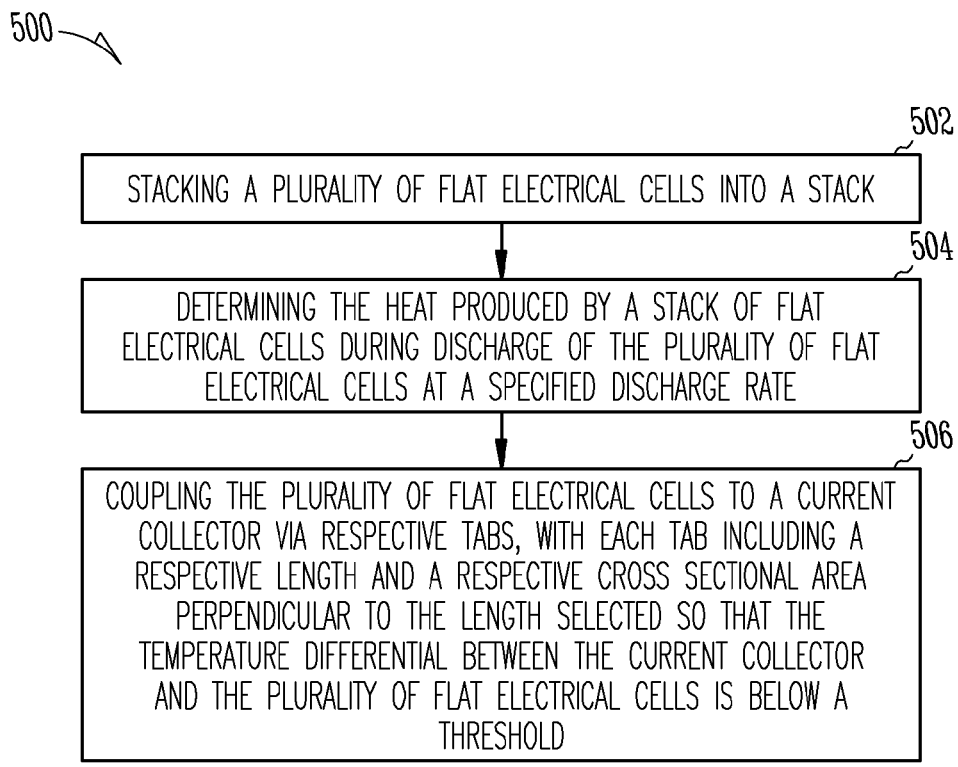
FIG. 5 illustrates a method of constructing a battery pack, according to some embodiments.

FIG. 5 illustrates a method of constructing a battery pack, according to some embodiments. At 502, the method includes stacking a plurality of flat electrical cells into a stack. At 504, the method includes determining the heat produced by a stack of flat electrical cells during discharge of the plurality of flat electrical cells at a specified discharge rate. At 506, the method includes coupling the plurality of flat electrical cells to a current collector via respective tabs, with each tab including a respective length and a respective cross sectional area perpendicular to the length selected so that the temperature differential between the current collector and the plurality of flat electrical cells is below a threshold.

Figure 6:
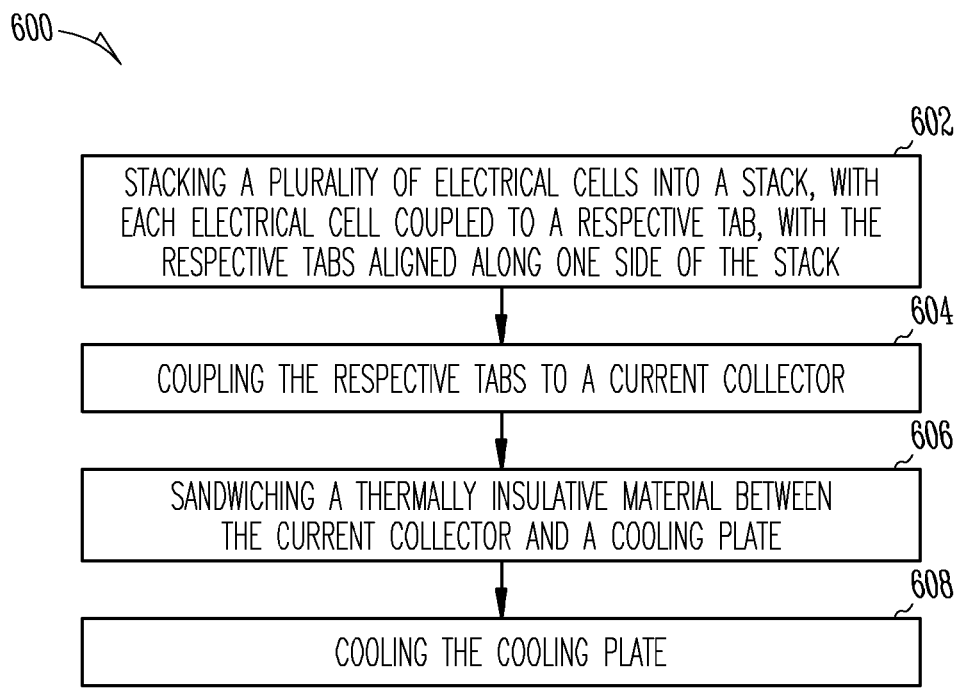
FIG. 6 illustrates a method of controlling the temperature of a battery pack, according to some embodiments.

FIG. 6 illustrates a method of constructing a battery pack temperature control system, according to some embodiments. At 602, the method includes stacking a plurality of electrical cells into a stack, with each electrical cell coupled to a respective tab, with the respective tabs aligned along one side of the stack. At 604, the method includes coupling the respective tabs to a current collector. At 606, the method includes sandwiching a thermally insulative material between the current collector and a temperature control panel. At 608, the method includes temperature control of the temperature control panel.

FIG. 7 illustrates a method of conducting heat out of a battery pack, according to some embodiments. At 702, the method includes conducting both electricity and a substantial amount of heat out of a stack of multiple electrical cells through a single element that conducts both heat and electricity to a collector panel common to all of the cells. At 704, the method includes conducting the heat but not the electricity through a thermal interface material contacting the collector panel to a temperature control system external to the cells.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A battery pack, comprising:
   a plurality of similarly-shaped electrical cells aligned in a stack, each cell comprising:
     a housing;
     at least one electrode of a first type and at least one electrode of a second type contained within said housing; and
     a first electrically and thermally conductive tab coupled to the at least one electrode of said first type and a second electrically and thermally conductive tab coupled to the at least one electrode of said second type, the first and second tabs extending through the housing; and
   an electrically and heat conductive collector panel comprising:
     a first surface electrically and thermally coupled to each of the first tabs; and
     a second surface opposite the first surface; and
   a thermal interface material that is electrically insulative and thermally conductive, the thermal interface material comprising:
     a first thermal interface surface in thermal contact with the second surface of the collector panel; and
     a second thermal interface surface opposite the first thermal interface surface; and
   a temperature control panel in thermal contact with the second thermal interface surface.

2. The battery pack of claim 1, wherein the housings of said electrical cells within said battery pack are spaced apart from one another with respective air gaps.

3. The battery pack of claim 1, wherein said at least one electrode of said first type is comprised of a plurality of substantially planar anodes and wherein said at least one electrode of said second type is comprised of a plurality of substantially planar cathodes.

4. The battery pack of claim 1, wherein the thermal interface material is selected from the group consisting of ceramic-filled silicone rubber and a thermal grease.

5. The battery pack of claim 1, wherein each of the first tabs has a mass that is substantially larger than a predetermined mass required to conduct current at a predetermined maximum cell discharge rate.

6. The battery pack of claim 1, wherein each of the first tabs has a ratio between a cross sectional area perpendicular to a length of the tab and the length that is significantly larger than a further ratio of cross sectional area perpendicular length to length sized to conduct energy at a rate required by a maximum discharge rate of the electrical cell.

7. The battery pack of claim 1, wherein the housing comprises a pouch with a first and second sheet sandwiching the at least one electrode of said first type and the at least one electrode of said second type, with the sheets sealed along a seam along an edge.

8. The battery pack of claim 1, further comprising:
   a second electrically and heat conductive collector panel comprising:
     a first surface electrically and thermally coupled to each of said second tabs; and
     a second surface opposite the first surface; and
   a second thermal interface material that is electrically insulative and thermally conductive, the second thermal interface material comprising:
     a first thermal interface surface in thermal contact with the second surface of the second collector panel; and
     a second thermal interface surface opposite the first thermal interface surface; and
   a second temperature control panel in thermal contact with the second thermal interface surface of the second thermal interface material.

9. The battery pack of claim 1, further comprising a temperature control system in thermal communication with said temperature control panel.

10. The battery pack of claim 9, wherein the temperature control system is configured to cycle a fluid through the temperature control panel to transfer heat from the temperature control panel.

11. The battery pack of claim 10, wherein the temperature control panel further comprises at least one lumens through which said fluid is cycled.

12. The battery pack of claim 10, wherein the temperature control panel further comprises at least one conductive tube thermally coupled to the temperature control panel and through which said fluid is cycled.

13. The battery pack of claim 9, wherein the temperature control system further comprises a liquid temperature control system coupled to a heating, ventilation and air conditioning ("HVAC") heat exchanger.

14. The battery pack of claim 9, wherein the temperature control system is coupled to a heat exchanger.

* * * * *